United States Patent [19]

Yamaguchi et al.

[11] Patent Number: 4,570,771
[45] Date of Patent: Feb. 18, 1986

[54] VISCOUS FLUID COUPLING HAVING CENTRIFUGAL VALVE MEANS

[75] Inventors: Hiorji Yamaguchi, Kariya; Takanobu Hori; Masaharu Hayashi, both of Toyota, all of Japan

[73] Assignee: Aisin Seiki Kabushiki Kaisha, Kariya, Japan

[21] Appl. No.: 445,602

[22] Filed: Nov. 30, 1982

[30] Foreign Application Priority Data

Nov. 30, 1981 [JP] Japan .......................... 56-178154[U]
Nov. 30, 1981 [JP] Japan ...................... 192487

[51] Int. Cl.$^4$ ..................... F16D 35/00; F16D 43/25; F16D 43/04
[52] U.S. Cl. ................. 192/58 B; 192/82 T; 192/103 F; 192/103 FA; 192/105 F
[58] Field of Search .................... 192/58 B, 82 T, 83, 192/103 FA, 105 F, 105 A, 103 F

[56] References Cited

U.S. PATENT DOCUMENTS

| | | | |
|---|---|---|---|
| 2,792,095 | 5/1957 | Sherman | 192/58 B |
| 2,903,083 | 9/1959 | Kelley | 192/82 T |
| 2,981,122 | 4/1961 | Kelly | 192/82 T |
| 3,033,334 | 5/1962 | Herbenar | 192/82 T |
| 3,191,733 | 6/1965 | Weir | 192/58 B |
| 3,259,220 | 7/1966 | Roper | 192/58 B |
| 3,363,734 | 1/1968 | Sabat | 192/58 B |
| 3,403,764 | 10/1968 | Sutaruk | 192/105 F X |
| 3,444,748 | 5/1969 | Sutaruk | 192/58 B X |
| 3,690,428 | 9/1972 | La Flame | 192/103 FA X |
| 3,840,101 | 10/1974 | Peter et al. | 192/82 T X |
| 3,893,555 | 7/1975 | Elmer | 192/58 B |
| 4,188,785 | 2/1980 | Ando et al. | 192/82 T X |
| 4,425,879 | 1/1984 | Shadday et al. | 192/82 T X |

FOREIGN PATENT DOCUMENTS 2439256 2/1976 Fed. Rep. of Germany ........ 192/58

Primary Examiner—Rodney H. Bonck
Attorney, Agent, or Firm—Sughrue, Mion, Zinn, Macpeak & Seas

[57] ABSTRACT

The viscous fluid coupling is comprised of a drive shaft having a hollow casing rotatably mounted thereon with one end of the drive shaft extending into the hollow casing. The interior of the casing is divided into a reservoir chamber and an operating chamber by means of a dividing plate secured within the housing. The rotor on the end of the shaft is rotatably mounted within the operating chamber and a thermostatically responsive valve member is rotatably mounted within the reservoir chamber for controlling the flow of fluid through a first passage extending through the divider plate. A centrifugally responsive valve member is located within the divider plate for providing additional control of the fluid through the first passage from the reservoir chamber to the operating chamber. A second passage extends through the divider plate for permitting the flow of fluid from the operating chamber to the reservoir chamber in response to a pumping action generated by relative rotation between the rotor and the casing. According to one embodiment, the centrifugally responsive valve also controls the flow of fluid through the second passage so that fluid will continue to be pumped through the second passage subsequent to the closing of the first passage by the valve. In a second embodiment, a separate flexible, resilient one-way valve is provided for controlling the flow of fluid from the operating chamber to the reservoir chamber through the second passage in response to the pumping pressure created by relative rotation between the rotor and the casing.

3 Claims, 7 Drawing Figures

VISCOUS FLUID COUPLING HAVING CENTRIFUGAL VALVE MEANS

BACKGROUND OF THE INVENTION

The present invention is directed to a viscous fluid coupling for a motor vehicle, more particularly to a viscous fluid coupling for controlling the rotation of an engine cooling fan in response to changes in temperature of the engine cooling water.

In conventional viscous fluid couplings of this type, when the vehicle engine is shut off, a substantial amount of viscous fluid remains within the fluid operating chamber. Therefore, upon starting the cold engine the viscous fluid remaining within the operating chamber will cause the fan to rotate at a substantial speed thereby unduly prolonging the warmup period for the engine. Furthermore, in conventional viscous fluid couplings, the communication between the fluid reservoir chamber and the fluid operating chamber is generally controlled by means of a swinging valve plate making it very difficult to obtain a good seal between the valve plate and the communication passage between the fluid reservoir and the fluid operating chamber.

SUMMARY OF THE INVENTION

The present invention provides a new and improved viscous fluid coupling which obviates the various drawbacks relating to prior art devices discussed above.

The present invention provides a new and improved viscous fluid coupling wherein the amount of viscous fluid remaining within the fluid operating chamber upon shutting off the vehicle engine is minimized.

The present invention provides a new and improved viscous fluid coupling which is capable of providing a good seal between the fluid reservoir and the fluid operating chamber.

The present invention provides a new and improved viscous fluid coupling comprising a covered casing having a central aperture therethrough, a drive shaft rotatably mounted in said central aperture with one end thereof extending into a chamber defined by said covered casing, a dividing plate within said chamber dividing the chamber into a fluid reservoir chamber and a fluid operating chamber, a rotor positioned within said fluid operating chamber connected to said drive shaft, first fluid passage means extending through said plate, first valve means operable to control fluid transmission from said fluid reservoir chamber into said fluid operating chamber through said first passage means, bimetal means operable to cause said first valve member to move in response to changes in temperature, second valve means operable to control the fluid transmission from said fluid reservoir chamber into said fluid operating chamber through said first passage means, said second valve means comprising a second valve member, spring means normally biasing said second valve member to close said first passage means when the speed of rotation of said rotor falls below a predetermined speed, second passage means extending through said rotor and third valve means for controlling the flow of fluid through said second passage means.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
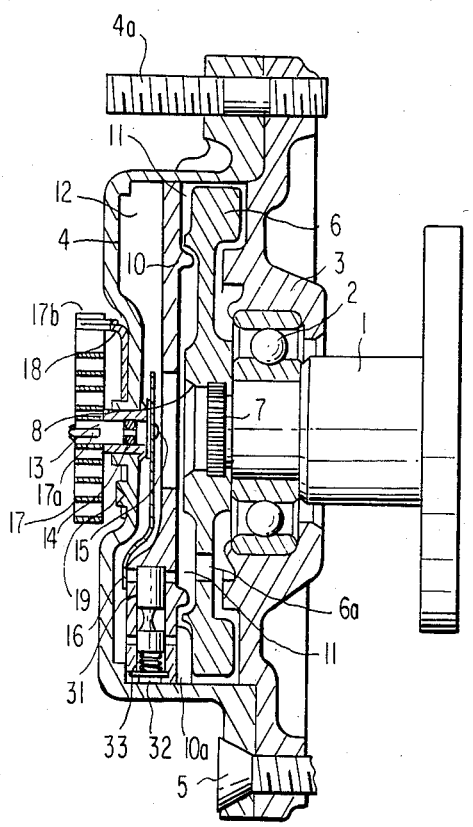
FIG. 1 is a cross-sectional view of a viscous fluid coupling according to a first embodiment of the present invention.
Figure 2:
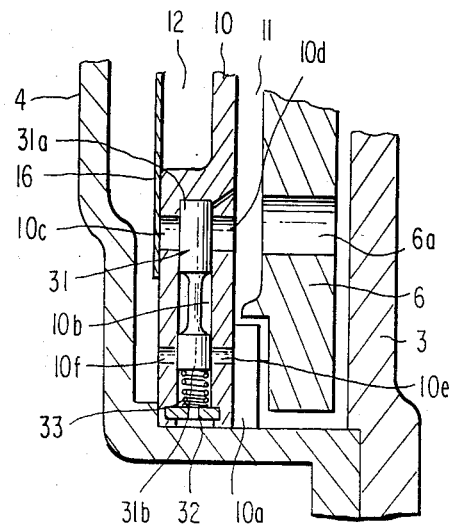
FIG. 2 is an enlarged cross-sectional view of a portion of the viscous fluid coupling shown in FIG. 1.
Figure 3:
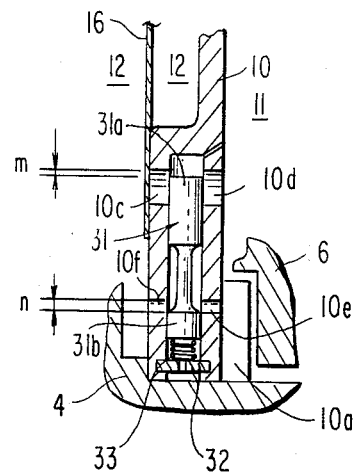
FIG. 3 is an enlarged cross-sectional view similar to FIG. 2 showing the parts in a different operative relation.

In the embodiment of FIGS. 1–3, the drive shaft 1 is driven by a vehicle engine by means of a fan belt (not shown). A casing 3 is rotatably supported on drive shaft 1 by means of a ball bearing 2. A cover 4 is secured to the casing by means of bolts 5. A rotor 6 is secured to the drive shaft 1 for rotation therewith by means of splines 7 and secured against axial movement by flanged portion 8 on the end of the drive shaft. The rotor 6 is mounted for rotation within the casing 3 with the surfaces thereof being closely spaced from the casing 3 and the cover 4. The rotor 6 is provided with a connecting hole 6a to allow for the passage of fluid from one side of the rotor to the other. A dividing plate 10 is secured to the inner surface of the cover 4 in closely spaced relation to the rotor 6 thereby dividing the interior space defined by the casing 3 and the cover 4 into a fluid operating chamber 11 and a fluid reservoir 12. A viscous fluid of a predetermined magnitude is provided within the chambers 11 and 12.

A fan (not shown) is adapted to be secured to the outer periphery of the cover member 4 by means of bolts 4a. A shaft 13 is rotatably mounted within the cover 4 in co-axial alignment with the drive shaft 1. The shaft 13 is provided with an O-ring seal 14. A valve plate 16 is secured to the end of the shaft 13 within the fluid reservoir chamber 12 by means of a bolt 15 so that the valve plate 16 will rotate with the shaft 13. One end, 17a, of a spiral bimetallic thermostatic strip 17 is engaged with the outer end of the shaft 13 and the other end 17b of the bimetallic strip 17 is supported by bracket 18 which is secured to the outer face of the cover 4 by means of a peened over projection 19. The bimetallic strip 17 is arranged so as to sense changes in temperature of the cooling water within a radiator (not shown) to thereby cause the shaft 13 to rotate the valve plate 16 in response to changes in the temperature of the cooling water.

A piston valve 31 is slidably positioned within a radially extending cylinder 10b formed in the outer portion of the dividing plate 10. The piston valve 31 has a first piston portion 31a and a second piston portion 31b and is biased toward the drive shaft 1 by means of a spring 33 which is interposed between the end surface of the second piston portion 31b and a stopper 32 secured in the outermost end of the cylinder. The dividing plate 10 is provided with connecting holes 10c, 10d, 10e, and 10f.

Under the conditions as illustrated in FIG. 2, the fluid communication between the holes 10c and 10d is interrupted by the first piston portion 31a and the fluid communication between the holes 10e and 10f is interrupted by the second piston portion 31b. At this time, the valve 16 also closes the hole 10c.

A description of the operation of the viscous fluid coupling is set forth hereinafter. When the engine is started by the turning of an ignition key the rotor 6 will be rotated within the fluid operating chamber 11 by means of the drive shaft 1. Since a small quantity of viscous fluid remains within the operating chamber 11, a torque is transferred from the rotor 6 to the casing 3 by means of viscous shear between the mating surfaces of the rotor 6 and the casing 3. Since only a small quantity of viscous fluid is disposed within the operating chamber 11, the speed of rotation of the dividing plate 10 which is part of the driven assembly is very low in comparison with the speed of rotation of the rotor 6. However, the speed of rotation is sufficient to move the piston valve radially outwardly against the biasing force of the spring 33 due to centrifugal force since the biasing force of the spring 33 is set to be very small. Thus, the piston valve 31 is urged into its open position as shown in FIG. 3 wherein the hole 10c is brought into communication with the hole 10d and the hole 10e is brought into communication with the hole 10f.

Within a short time after the starting of the engine, the temperature of the cooling water will exceed a predetermined value whereby the plate 16 will be rotated by means of the movement of the bimetallic strip 17 to uncover the hole 10c so that the hole 10c will be brought into communication with the fluid reservoir chamber 12. Thus, the viscous fluid can now be transmitted from the reservoir chamber 12 to the fluid operating chamber 11 through the holes 10c and 10d. The quantity of the viscous fluid within the operating chamber 11 is now increased and the torque transfer accomplished by the viscous shear between the rotor 6 and the driven assembly will be increased correspondingly. As a result, the speed of rotation of the driven assembly is increased in proportion to the increase in the quantity of viscous fluid which is transmitted into the fluid operating chamber 11. A portion of the viscous fluid within the operating chamber 11 is urged toward the outer portion of the operating chamber 11 due to the centrifugal force. The fluid will impinge upon a projection 10a which is located on the dividing plate 10 adjacent the hole 10e. Since the speed of rotation of the rotor 6 is still greater than that of the driven assembly, the impingement of the fluid on the projection 10a generates a viscous fluid pressure thereby causing a pumping action of the viscous fluid through the holes 10a and 10f to the reservoir chamber 12. Thus, the viscous fluid will be continuously circulated between the chambers 11 and 12 through the holes 10c and 10d and the holes 10e and 10f thereby maintaining the quantity of viscous fluid within the operating chamber at a constant level. The circulation of the fluid will be accomplished under idling conditions of the engine, i.e., about 500 rpm. When the engine is overcooled, the bimetallic strip 17 will cause the plate 16 to rotate in the opposite direction to reduce or interrupt fluid communication between the reservoir chamber 12 and the hole 10c. Since the valve plate 16 can control the degree of opening for the hole 10c in response to a sensed temperature, the quantity of viscous fluid transmitted to the operating chamber 11 is effectively controlled in response to the sensed temperature of the bimetallic strip 17. When the valve plate 16 closes or partially closes the hole 10c the viscous fluid within the operating chamber 11 is still being transmitted to the reservoir chamber 12 by means of the above-described pumping operation as long as there is a difference in the speed of rotation of the drive shaft and the speed of rotation of the driven assembly. Thus, the quantity of viscous fluid in the operating chamber 11 will be decreased and the speed of rotation of the driven assembly will be reduced accordingly to thereby reduce the speed of rotation of the fan.

When the engine is shut off, the drive shaft 1 and the rotor 6 will continue to rotate due to inertia for a short period of time and the driven assembly will continue to rotate even a little longer. The biasing force of the spring 33 is set such that the piston valve 31 is moved to the closed position when the speed of rotation of the engine falls below the normal idling speed so that the valve 31 will interrupt fluid communication between the reservoir chamber 12 and the operating chamber 11.

As best seen in FIG. 3, when the distance or gap m defined between the end surface of the first piston portion 31a and the innermost edges of the holes 10c and 10d upon sliding movement of the piston valve against the spring 33, the distance or gap n between the end surface of the second piston portion 31b and the innermost edges of the holes 10e and 10f will be larger, that is, $m < n$. As soon as the engine speed becomes lower than the idling speed, the fluid communication between the holes 10c and 10d will be interrupted prior to the interruption of the fluid communication between the holes 10e and 10f. For the short time that fluid communication is permitted only through the holes 10e and 10f, most of the remaining viscous fluid within the operating chamber 11 will be transmitted through the reservoir chamber 12 by the pumping operation described above.

Figure 4:
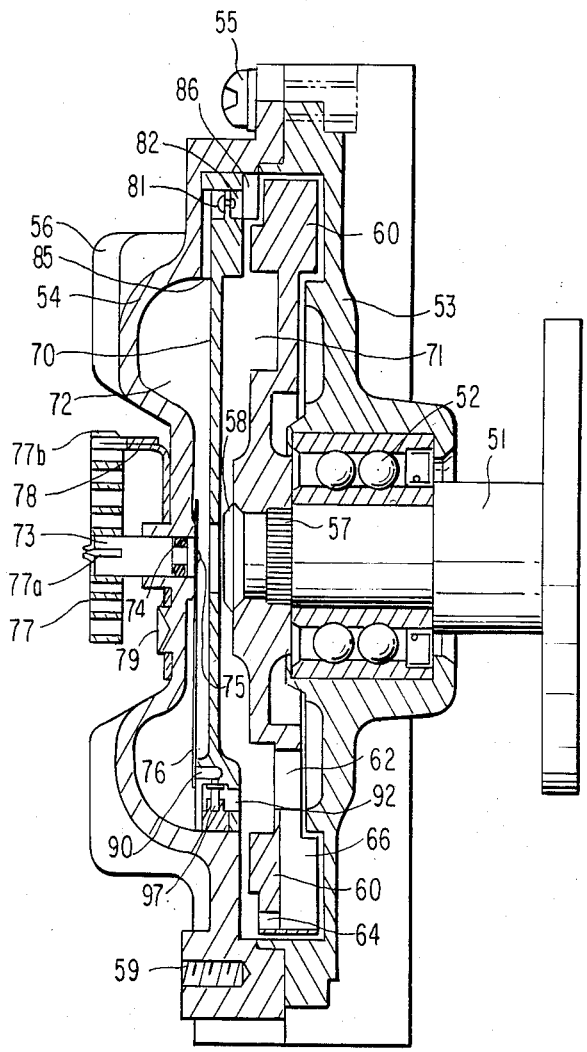
FIG. 4 is a cross-sectional view of a viscous fluid coupling according to a second embodiment of the present invention.
Figure 5:
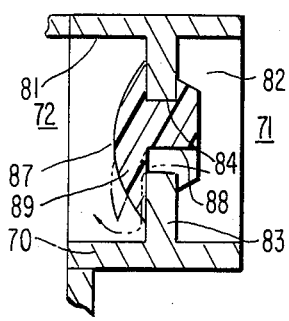
FIG. 5 is an enlarged cross-sectional view of a first valve means shown in FIG. 4.
Figure 6:
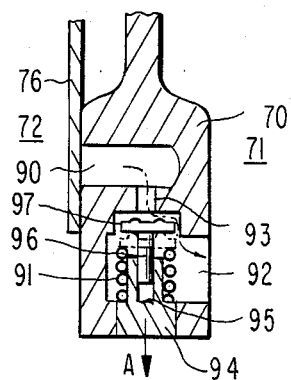
FIG. 6 is an enlarged cross-sectional view of a second valve means shown in FIG. 4.

In the embodiment of FIGS. 4-6, a casing 53 having a cover 54 secured thereto by means of bolts 55 is rotatably mounted on a drive shaft 51 by means of a bearing 52 similar to the arrangement described in the previous embodiment. The cover 54 is provided with cooling fins 56 and threaded bolt holes 59 to facilite the securement of a fan thereto.

A rotor 60 is secured to the drive shaft 51 for rotation therewith by means of splines 57 and is secured against axial movement by means of the flanged projection 58 on the end of the shaft 51. The rotor 60 is provided with connecting holes 62 and 64 which are inter-connected by a fluid passage 66 on the side of the rotor 60 adjacent the casing 53. A dividing plate 70 is secured within the cover 54 and in addition to the central passage, is provided with two fluid passages adjacent the outer periphery thereof which will be described in detail hereinafter. The dividing plate 70 divides the interior chamber defined by the casing 53 and cover 54 into a fluid operating chamber 71 and a fluid reservoir chamber 72. A shaft 73 having an O-ring seal 74 is rotatably mounted in the cover 54 in coaxial alignment with the shaft 51. A valve plate 76 is secured to the shaft 73 for rotation therewith by means of a bolt 75. The inner end 77a of a bimetallic strip 77 is secured to shaft 73 and the outer end 77b of the bimetallic strip 77 is secured to a support bracket 78 which is secured to the outer surface of the cover member 54 by means of a peened over projection 79.

A first passage through the dividing plate 70 is located at the top of the plate as viewed in FIG. 4 and the passage per se is shown in greater detail in FIG. 5. A pair of opposed recesses 81 and 82 are formed in the dividing plate 70 adjacent the outer periphery thereof and are separated by a relatively thin dividing wall 83 having an opening 84 communicating the two recesses. A passage 85 on the face of the dividing plate 70 adjacent the cover member 54 communicates the recess 81 with the fluid reservoir chamber 72. A projection 86 is formed on the opposite face of the dividing plate 70 adjacent the recess 82 which will act in the same manner as the projection 10a in the previous embodiment to create a pumping action. A valve member 87 of resilient synthetic or rubber material is secured within the opening 84 and is provided with a recess 88 which extends through the hole 84 behind a flexible flap-like portion 89 of the valve member.

A second passage through the dividing plate 70 is shown at the bottom of FIG. 4 and is shown in greater detail in FIG. 6. A pair of radially offset recesses 90 and 92 extend into the dividing plate 70 from opposite sides thereof and are separated from each other by a wall having an opening 93 extending therethrough in communication with the recesses 90 and 92. A cylindrical valve support member 94 is secured in a radially directed aperture in the outer periphery of the dividing plate 70 and is provided with a cylindrical recess 95 in the innermost end thereof for slidably receiving the cylindrical shank 96 of a valve member 97 which is designed to cooperate with the opening 93 to open and close communication between the two recesses 90 and 92. A spring 91 extends between the cylindrical support 94 and the valve member 97 for normally biasing the valve member 97 into the closed position relative to the opening 93. The valve member 97 is adapted to be moved radially outwardly under the influence of centrifugal force in the direction of the arrow A to the dotted line position shown in FIG. 6 in order to permit fluid communication between the recess 90 and the recess 92. The recess 92 is maintained in constant communication with the fluid operating chamber 71 and fluid communication between the recess 90 and the fluid reservoir chamber 72 is controlled by means of the rotatable valve plate 76.

The operation of the viscous fluid coupling according to the embodiment of FIGS. 4–6 is substantially the same as the operation described with respect to the embodiment of FIGS. 1–3. More specifically, when the engine is started, the drive shaft 51 will impart rotation to the rotor 60 and due to the small quantity of viscous fluid remaining within the operating chamber 11, torque will be transmitted from the rotor 60 to the driven assembly comprised of the casing 53, cover 54 and fluid divider plate 70. However, the speed of rotation of the driven assembly is very small relative to the speed of rotation of the rotor 60. However, the rotation of the driven assembly will be sufficient to cause the valve member 97 to move radially outwardly against the biasing force of the spring 91 since the biasing force of the spring is chosen to be very small. Thus, the valve member 97 will be moved to its open position. Shortly after starting the engine, the temperature of the cooling water will exceed a predetermined value and the valve member 76 will be rotated by the bimetallic strip 77 to allow fluid communication between the reservoir chamber 72 and the operating chamber 71. The increase in fluid in the operating chamber will thereby cause the speed of rotation of the driven assembly to increase.

A portion of the viscous fluid within the operating chamber 71 will impinge against the projection 86 on the dividing plate 70 due to the relative rotation between the rotor and the driven assembly thereby generating a fluid pressure which will cause the flexible flap portion 89 of the valve member 87 to move away from the dividing wall 83 and allow the viscous fluid within the operating chamber to be pumped from the operating chamber 71 to the reservoir chamber 72 through the recess 88 in the valve member 87 secured in the opening 84. Thus, a constant circulation of the viscous fluid will be provided for between the two chambers.

When the engine is over-cooled, the bimetallic strips 77 will cause the plate valve 76 to move in the closing direction thereby reducing the fluid communication between the reservoir chamber 72 and the recess 90 in the dividing plate 70. The viscous fluid within the operating chamber 71 will, however, still be transmitted to the reservoir chamber 72 by means of the pumping operation as long as the speed of rotation of the rotor is higher than the speed of rotation of the driven assembly. Thus, the quantity of viscous fluid within the operating chamber 71 will be reduced and the speed of rotation of the drive assembly and the fan secured thereto will be reduced accordingly.

When the engine is shut off the drive shaft 51 and the rotor 60 will still rotate due to inertia for a short period of time and the driven assembly will continue to rotate for a slightly longer time. The biasing force of the spring 91 is set such that the valve member 97 will move to its closed position when the speed of the engine is reduced below the idling condition and thereby interrupt fluid communication between the reservoir chamber 72 and the operating chamber 71. The transmission of the viscous fluid from the operating chamber 71 to the reservoir chamber 72 past the valve member 87 will still continue for a while due to the pumping action so that the quantity of viscous fluid within the operating chamber 71 will be reduced substantially when the engine is shut off.

Figure 7:
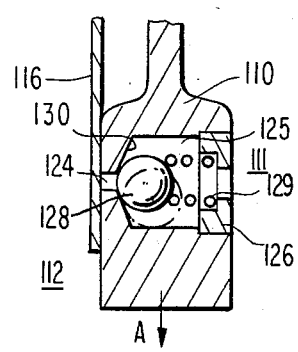
FIG. 7 is an enlarged cross-sectional view showing a modified form of the valve means in FIG. 6.

FIG. 7 shows a modification of the centrifugally operated valve assembly in FIG. 6. The dividing plate 110 which separates the fluid operating chamber 111 from the fluid reservoir chamber 112 is provided with a recess 125 extending axially inwardly from the fluid operating chamber 111 adjacent the outer periphery of the dividing plate 110. A fluid passage 124 communicates the recess 125 with the fluid reservoir chamber 112 under the control of a rotatable valve plate 116 which in turn is under the control of a bimetallic strip similar in the previous embodiments. The bottom of the recess 125 is provided with a sloped wall 130 and a ball valve 128 located within the recess is normally biased into engagement with the sloped wall 130 by means of a spring 129 which bears against an apertured ring 126 secured in the outer end of the recess 125. When the ball valve 128 is in the solid line position as shown in FIG. 7, communication between the fluid passage 124 and the recess 125 will be blocked. However, upon rotation of the divider plate 110 with the driven assembly, centrifugal force will cause the ball valve 128 to move in the direction of the arrow A whereby the ball valve 128 will be moved to the dotted line position as shown in FIG. 7 thereby permitting fluid communication between the fluid reservoir chamber and the fluid operating chamber through the passage 124, recess 125 and the apertured ring 126. Thus, the operation of the centrifugally operated valve of FIG. 7 is substantially the same as that of the centrifugally operated valve shown in FIG. 6.

Obviously, many modifications and variations of the present invention are possible in line of the above teachings. It is therefore to be understood that within the scope of the appended claims, the invention may be practiced otherwise than as specifically described herein.

What is claimed is:

1. A viscous fluid coupling comprising a drive shaft, hollow casing means rotatably supported on said drive shaft, plate means dividing the interior of said hollow casing means into a fluid reservoir chamber and a fluid operating chamber, a rotor secured for rotation with said drive shaft and located within said fluid operating chamber, passage means extending through said plate means in communication with said operating chamber and said reservoir chamber, a first valve member operatively associated with said passage means for controlling fluid transmission from said fluid reservoir chamber into said fluid operating chamber, temperature responsive bimetal means located outside of said casing means and operatively connected to said first valve member for moving said first valve member in response to changes in temperature, a second valve means operatively associated with said passage means for additionally controlling fluid transmission from said fluid reservoir chamber into said fluid operating chamber in response to centrifugal force generated by the rotation of said casing means, spring means normally biasing said second valve means into a position to prevent the transmission of fluid through said passage means in the absence of centrifugal force and an additional passage means extending through said plate means, said second valve means including a radially disposed piston valve having a first valve portion for controlling fluid transmission from said reservoir chamber into said operating chamber through said passage means and an additional valve portion operatively associated with said additional passage means to control the passage of fluid through said additional passage means.

2. A viscous fluid coupling as set forth in claim 1 wherein said piston valve is slidably received within said plate means for radial movement therein.

3. A viscous fluid coupling as set forth in claim 1 wherein said additional valve portion is so arranged as to permit fluid communication from said operating chamber to said reservoir chamber when said first valve portion has interrupted fluid transmission from said reservoir chamber into said operating chamber under the influence of said spring means.

* * * * *